US006926032B2

(12) United States Patent
Nawaz

(10) Patent No.: US 6,926,032 B2
(45) Date of Patent: Aug. 9, 2005

(54) PRESSURE-REDUCING CONTROL VALVE FOR SEVERE SERVICE CONDITIONS

(75) Inventor: Shah M. Nawaz, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 10/243,718

(22) Filed: Sep. 13, 2002

(65) Prior Publication Data

US 2004/0050433 A1 Mar. 18, 2004

(51) Int. Cl.[7] .............................................. F16K 11/10
(52) U.S. Cl. ............................. 137/625.33; 137/625.37
(58) Field of Search .......................... 137/625.3, 625.33, 137/625.37, 625.39

(56) References Cited

U.S. PATENT DOCUMENTS

| 3,813,079 | A | * | 5/1974 | Baumann et al. ........... 251/127 |
| 4,398,563 | A | * | 8/1983 | Kay et al. .................... 138/42 |
| 4,407,327 | A | * | 10/1983 | Hanson et al. .......... 137/625.37 |
| 4,456,033 | A | * | 6/1984 | Kay et al. .................... 138/42 |
| 5,020,571 | A | * | 6/1991 | Tartaglia et al. ......... 137/625.3 |
| 6,536,473 | B2 | * | 3/2003 | Bohachuk .............. 137/625.37 |

* cited by examiner

Primary Examiner—John Fox
(74) Attorney, Agent, or Firm—Abelman, Frayne & Schwab

(57) ABSTRACT

A severe service condition pressure reduction valve that is resistant to damage by debris carried by high-pressure process fluid stream and operates at acceptable noise levels includes a first stage annular member in the form of a tube or sleeve that is closely fitted into the axial annular opening of a disk stack trim or drag valve, the first stage member having a plurality of radial openings extending through the wall of the tube or sleeve that are aligned with, and correspond in radial and axial or longitudinal spacing to the flow paths in the disk stack valve. The external surface of the first stage member is provided with axially-spaced circumferential raised areas or rings that engage the internal surface of the disk stack annulus to prevent axial flow along the exterior surface of the sleeve.

21 Claims, 4 Drawing Sheets

PRESSURE-REDUCING CONTROL VALVE FOR SEVERE SERVICE CONDITIONS

FIELD OF THE INVENTION

This invention relates to pressure reduction control valves used in the petroleum industry, and particularly to valves utilized on high pressure liquid and gas piping system that are rated for severe service.

BACKGROUND IN THE ART

In the severe service pressure-reducing control valve art, two distinct technologies have been available. Both technologies utilize an annular device that is inserted into the pipeline and a plug that causes the flow in the pipeline to be radially diverted from the axial flow path through a plurality of passages to be discharged from outlet ports in the exterior surface of the device to effect the reduction in pressure, after which the fluid flow is returned to a downstream pipeline.

A pressure-reducing valve trim commonly referred to as the drilled hole cylinder also known as a single stage, multiple flow passage cartridge is in the form of an annular metal tube or sleeve, typically fabricated from 300 and 400 series stainless steel through which a plurality of radial openings extend. This device can include a plurality of annular sleeves in a concentric assembly, each sleeve having a plurality of radial openings extending a radial fluid path from the axial opening of the innermost tube to the adjacent sleeve through appropriate channels.

A principal drawback of this type of pressure reducing trim is that due to mechanical space limitations, the number of concentric sleeves is restricted to three or, at most, four. Under severe conditions in gas service, with a sufficiently great fluid pressure differential, the gas moves at supersonic velocity and one or more stages of the valves can become choked. For liquid service the choked flow occurs as the liquid expands after passing through a radial orifice, the velocity of the fluid increases with a corresponding decrease in pressure. When the pressure drops below the vapor pressure of the fluid, the material is at least partially vaporized. This condition leads to excessive noise, vibration and deterioration of the fluid flow rate. It is also known that the second and third stages in the valves of this configuration have limited pressure-reducing capability.

A second type of pressure-reducing valve is the multiple-path, multiple-stage, stacked disk drag valve, also known as a multi-labyrinth trim valve. This device operates on the basis of a high energy loss as the fluid passes through it. In this valve, the pressure reduction is achieved by passing the fluid through multiple directional changes in a tortuous path. The plurality of tortuous paths are defined by a series of annular metal disks that are braised together.

The stacked disk device is annular with a central axial opening through which the high pressure fluid flow enters. A movable plug is positioned in the central channel or opening formed by the annular disks to block the flow of fluid and cause the fluid to be diverted through the plurality of generally radial tortuous passages. The design of this valve avoids the problem of a choked flow at every stage. One particular advantage of this trim design is that the number of pressure-reducing stages is not limited to four stages and rapid increase in fluid velocity, i.e., the conversion of pressure into velocity, is not required to achieve the desirable pressure drop. The axial or longitudinal spacing of the disks, as well as the radial passage inlet ports provide a regular array on the interior surface of the central opening of the device.

The construction and methods of operation of the high energy loss control valves are well known in the art. Their structure and functioning are disclosed in U.S. Pat. Nos. 3,513,864 and 3,514,074 issued in 1970.

One limitation of the drag valve is that the metal disks are made from relatively soft materials, and when used in applications in which metallic particles or process debris are transported in the fluid, this debris can become imbedded in the inlet of the drag valve radial flow paths and as the plug is lowered to control the flow rate through the valve, extensive damage results to the valve trim. The inlet passages are sheared and the plug can jam, rendering the valve inoperable. Since the valve trim is one-piece braised assembly, repairs to damage are difficult and the replacement costs are high.

The tube or sleeve pressure-reducing device is generally the more robust in resisting damage and/or loss in operating characteristics due to debris because of its simple design. However, the pressure reduction capabilities are limited by choked flow produced by this device due to cavitation in liquid service and sonic velocity in gas applications.

In view of these and other limitations of the prior art, it is an object of the present invention to provide a pressure-reducing valve of improved construction for use in severe service conditions on high pressure fluid pipelines.

A particular object of the inventor is to provide a valve trim for automatic pressure control valves that has a high tolerance to debris in the process fluid stream and improved pressure-dissipating characteristics not found in valves of the prior art.

Another object is to provide a pressure-reducing valve that comprises a hardened metal barrier to be utilized with fluids that are carrying metal particles or other debris that cause damage to and/or would otherwise adversely effect the functioning of a drag type valve.

A further object of the invention is to provide an improved pressure-reducing valve that is easy to construct and that will withstand severe service conditions due to its rugged construction.

SUMMARY OF THE INVENTION

The above objects and other advantages are achieved by the pressure reduction valve of the invention which comprises a first stage annular member in the form of a tube or sleeve that is closely fitted into the axial annular opening of a conventional disk stack trim valve. The first stage member has a plurality of radial openings extending through the wall of the tube or sleeve and aligned with the flow paths of the disk stack. The plurality of aligned openings in the first stage member correspond in radial and axial or longitudinal spacing to the flow paths in the disk stack valve.

The external surface of the first stage member is provided with axially-spaced circumferential raised areas or rings that engage the internal surface of the disk stack annulus to prevent axial flow along the exterior surface of the sleeve. In a preferred embodiment, the sleeve is thermally fitted into the annulus of the disk stack. Press fit and shrink fit techniques can also be used to form the assembly, depending on the size and the type of material utilized in fabricating the sleeve.

The diameters of the holes in the sleeve are preferably slightly smaller than the largest dimension of the disk stack inlet passage. The number of openings in the sleeve and the position of these openings are determined in relation to the desired flow capacity and flow characteristics of the valve.

The holes are evenly spaced on the surface of the sleeve. The distances between the circumference of one opening hole to the edge of an adjacent opening is equal to or greater than the diameter, d, of the openings.

In a preferred embodiment, the area defined by the openings of the fluid passages in the exterior surface of the first stage member will be less than about 35% of the total surface area defined by the exterior surface of the tube. The total area "a" of the openings of uniform diameter "d" and defined by the number "n" of the fluid passages in the tube is calculated as follows:

$$a = (3.14 \times d^2/4) \times n \quad (1)$$

The surface area "A" of the sleeve having a diameter "D" and a longitudinal or axial height dimension "H" is calculated as follows:

$$A = 3.14 \times D \times H \quad (2)$$

In the preferred embodiment:

$$a \text{ is less than } 0.35 \times A. \quad (3)$$

The diameters and spacing of the fluid passageways can be uniform or vary from one axial position to another. For example, the first stage can be provided with larger fluid passageways at the inlet end and smaller diameter passageways at the opposite end in order to provide more control over the pressure reduction. Other variations will be apparent to those of ordinary skill in the art. In general, it is desirable to have approximately the same number of passages in stage one and in alignment with the passages of the second stage.

The wall thickness of the sleeve or tube is in the range of from 0.25 inches/6 mm to 0.75 inches/20 mm. The first stage member is preferably constructed from stainless steel, but can be fabricated from other metal(s) that are plated and/or hardened to provide a longer service life. Suitable materials include series 400 hardened stainless steel, cobalt-based alloys, Inconel® alloys and tungsten carbide.

The sealing rings are preferably formed by machining the exterior surface of the first stage member. Alternative constructions include the thermal fitting of separate sealing rings in grooves machined or molded into the exterior surface, or by welding split rings at the desired spaced locations on the surface.

The seal formed by the external surface of the rings in the sleeve with the internal surface of the disk stack is by metal-to-metal compression. In a preferred embodiment, the drag disk stack is typically a braised one-piece construction purchased from a commercial source. The inside diameter of the axial opening or channel is determined and the sleeve to be inserted is formed with the outside diameter of the sealing rings of a dimension that will permit its insertion into the disk stack following thermal treatment, and its expansion under ambient or operating conditions to provide an effective metal-to-metal seal between the respective surfaces to thereby prevent the axial flow of fluid between these elements.

The valve of the invention provides a high level of tolerance to embedded debris in the process fluid due to the ability of the first stage sleeve or tube to withstand damage by such debris. To the extent that the radial openings become blocked by such debris, a back-flushing or mechanical scraping of the interior of the sleeve will be sufficient to remove any entrained debris.

In the event that the internal sleeve is damaged or becomes so clogged as to seriously effect the operating characteristics of the valve, the assembly can be removed from service for maintenance. Removal from the disk stack can be accomplished by utilizing a mandrel of appropriate configuration and a bearing press. Alternatively, removal of the sleeve from the disk stack can be facilitated by thermal treatment. The sleeve can be replaced with a new sleeve or rehabilitated and returned to service.

As will be understood by one of ordinary skill in the art, the pressure loss of the fluid can be increased by offsetting the alignment of the radial openings in the sleeve relative to the inlets in the adjacent stacked disks. A desirable pressure loss does occur due to the sudden expansion of the fluid as it exits the radial openings into the larger free volume defined by the projecting external ceiling rings that are formed in the surface of the sleeve.

In a particularly preferred embodiment, the sleeve is manufactured from a hardened material. The annular sleeve can be drilled or otherwise provided with machined radial openings extending through the sidewall. The annular ribs can be formed before or after positioning the holes as by machining the exterior surface of the sleeve. The size of the radial openings, the number of openings at each axial or longitudinal position can be the same or varied in order to achieve the desired pressure reduction and fluid flow characteristics for the control valve assembly.

The passages through the first stage members can be uniform or provide an increasing or a larger flow area adjacent the outlet port. The diameter of the radial passages are preferably in the range of from 0.0625 inches (2 mm) to 0.375 inches (10 mm).

The outlet ports of the first stage member can be aligned with the inlet ports of the stacked disk device, or offset to provide a further decrease in pressure due to the frictional losses as the fluid impacts and changes direction at the surface of the stacked disk device.

In a further preferred embodiment, the first stage member can comprise two or more tubes or sleeves, each constructed as described above to further increase the energy loss of the flowing fluid.

BRIEF DESCRIPTION OF THE DRAWINGS

The following detailed description of the preferred embodiments of the invention is to read in conjunction with the accompanying drawings in which.

DETAILED DESCRIPTION OF PREFERRED EMBODIMENTS

Figure 1:
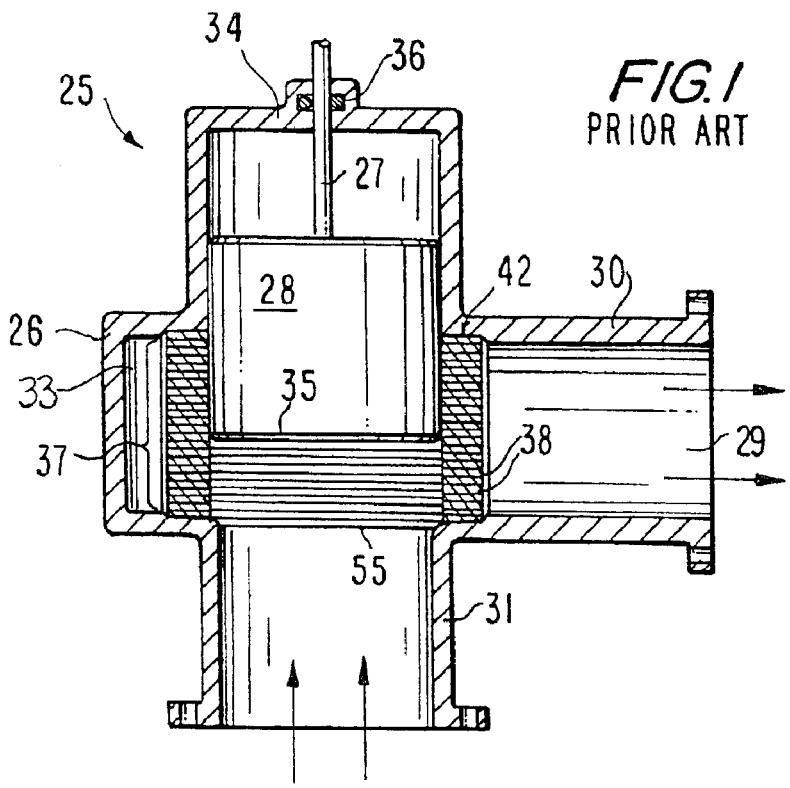
FIG. 1 is a sectional view through a high energy loss stacked disk valve of the prior art.

In accordance with the present invention, an annular tube or sleeve having a plurality of radial fluid passages is sealingly fitted as a first-stage into the annulus of a high energy loss stacked disk valve of the type known to the prior art. With reference to FIG. 1, there is shown in section, a typical construction of a stacked disk control valve 25 of the prior art. Control valve 25 includes a valve housing 26 within which a valve plug 28 is mounted for axial movement in controlling relation to downstream fluid flow passage 29 formed by outlet section 30, which is at a right angle to inlet portion 31. The valve housing 26 is formed with an annular space 33 that surrounds disk assembly 37 to contain and direct the pressure-reduced fluid to outlet passage 29. The disk stack assembly 37 is comprised of a plurality of punched disks, the disk construction being described in detail below.

The valve plug 28 is mounted for reciprocal movement in inlet portion 31 and can be withdrawn into head extension portion 34 within which the plug is slidably received in the fully-open position and from which the plug can be moved into throttling relation across the outlet 29 for incrementally moving between a fully open and fully closed position. An annular plug shoulder 35 engages valve seat 55 to terminate fluid flow through the valve. Plug control shaft 27 passes through seal 36 formed in portion 34 of the housing.

Figure 2:
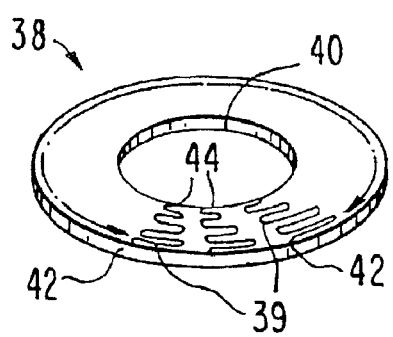
FIG. 2 is a simplified top perspective schematic view illustrating a disk of the type known to the prior art that can be utilized in the device of FIG. 1.

With reference to FIG. 2, there is shown in schematic illustration a disk or plate 38 that, in combination with other similar disks, forms a generally radial tortuous path from the inlet side 31 of valve 25 and through the surrounding chamber 33 into outlet portion 30. The high pressure fluid flows from the annulus 40 through the individual tortuous passages 39 to exit outlet ports 42 in the exterior surface of plate 38 of the stacked disk assembly 37.

Figure 3:
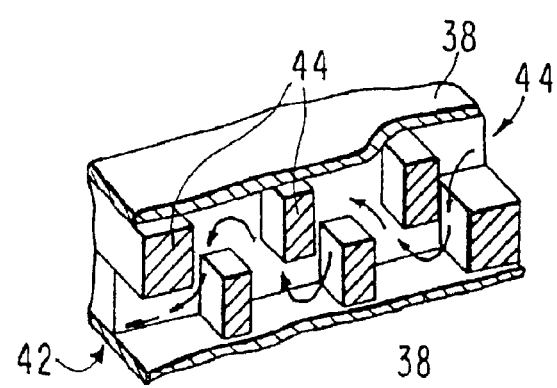
FIG. 3 is a top perspective schematic view partly in section, illustrating a typical flow path forming part of a punched disk stack assembly of the prior art.

A schematic illustration of a portion of representative flow path from a punched disk stack of the prior art is shown in FIG. 3. A tortuous path is followed by the fluid, represented by the series of arrows. Each of the disks 38 is formed with a plurality of baffles 44, which cooperate to create a continuously changing path for the flowing pressurized fluid, each turn producing turbulence and a frictional energy loss; further frictional energy losses are incurred as a result of the contact with the sidewalls of the disk and baffles. The length of the path and its configuration determines the overall pressure differential between the inlet ports 44 and the pressure at the outlet ports 42.

As will be apparent, if the high pressure fluid contains metal particles or other process debris, the individual passages formed by the stacked disks will become clogged and effectively blocked so that the number of passages will be reduced over time. Moreover, because of the relatively softer metals used in fabricating the disks 38, the impacted debris so deforms or otherwise damages the material that it cannot be repaired.

Figure 4:
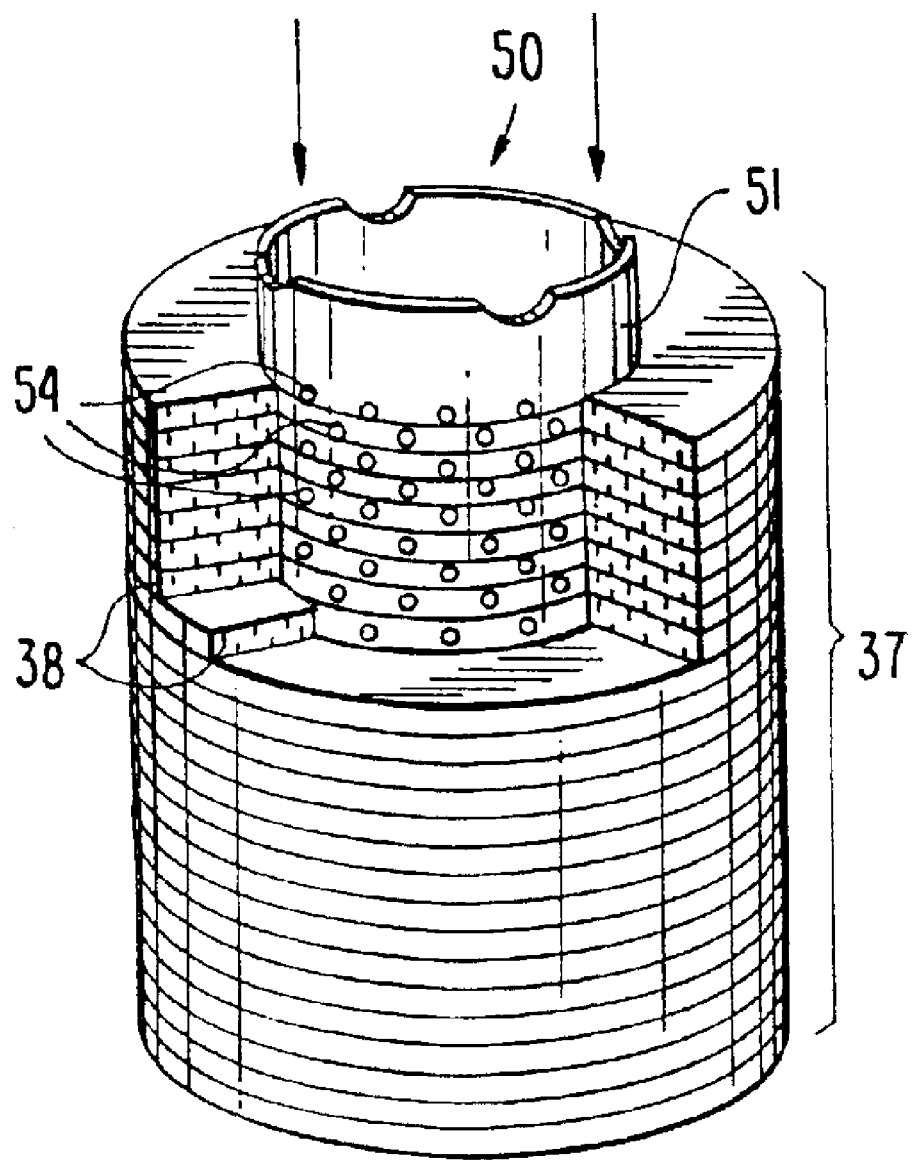
FIG. 4 is a top and side perspective view, partly in section, illustrating one preferred embodiment of the control valve of the invention.

The improved pressure reducing control valve assembly of the invention is illustrated in FIGS. 3 and 4 where the first stage pressure reducing member 50 is shown fitted within the annulus of a stacked disk device 37. First stage member is in the form of a tube 51 that is provided with a plurality of orifices 54 leading to annular fluid passageways 56.

Figure 5:
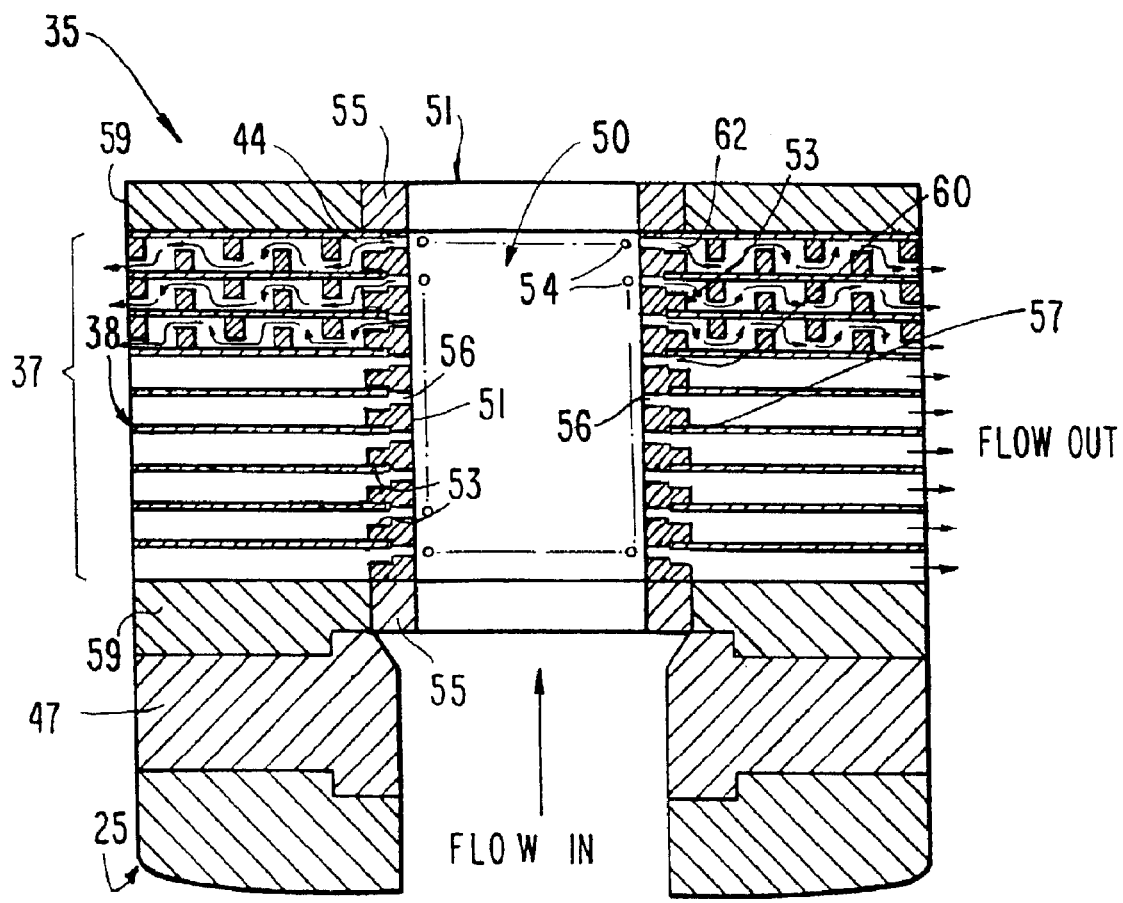
FIG. 5 is a section schematic illustration of the first stage member of the invention assembled to a stacked disk valve trim.

With further reference shown in FIG. 5, seals 55 are provided between the upper and lower peripheral exterior surfaces of first stage member 50 and corresponding elements on assembly 37. A seat ring 47 is also provided to support the control valve assembly in housing 25. Disk spacers 59 are also provided at the upper and lower ends of the disk stack assembly.

Each of the plurality of annular fluid passages 56 through the wall of tube 51 is positioned with respect to the inlet passages in the surrounding stacked disk device. Each radial passageway has an inlet port 54 and a discharge or outlet port 57, the discharge port being preferably aligned with the inlet port 44 of the adjacent disk 38. As shown in FIG. 4, in order to prevent longitudinal or axial flow between the exterior of tube 51 and the interior surface of disk assembly 37, a series of longitudinally-spaced sealing rings 53 are provided at positions which correspond to the regions between the inlet ports 44 of the stacked disk assembly 37. These projecting sealing rings can be formed by machining the surface of tube 51 proximate the outlet ports 57.

The outer diameters of the sealing rings or ribs 53 are dimensioned to provide a secure and substantially fluid-tight fit with the internal surface of the disk stack assembly 37. It is to be understood that some flow of fluid will occur between longitudinally adjacent ports, since there is no direct conduit to contain the fluid flow between the first stage member outlet ports and the stacked disk inlet ports.

The diameter of the passages 56 which can be drilled or machined in tube 51, are somewhat less than the largest dimension of the passages in the disk stack inlet ports. The number of radial passages 56 and their placement are closely related to, and determined by the desired flow capacity and flow characteristics of the assembly. The determination of these spatial arrangements is well within the skill of the art, in view of the description that is provided herein.

The annular region downstream of the exit ports 57 is where pressure recovery and first stage energy loss occurs. The size and configuration of the pressure recovery region is such that the back pressure created at the inlet ports 44 to the stacked disk will prevent choked flow for liquids carried through the assembly. In the case of gases, the back pressure is calculated to be sufficiently high to prevent sonic velocity through the axial passages.

It will also be understood that the hole size, the total number of holes and the hole density in the tube 51 are a matter of engineering design to be determined for each particular field application. Factors to be considered in determining the size, number and spacing of the axial fluid passages are the differential pressure drop to be achieved across the valve, the minimum and maximum flow capacity, fluid density and entrained particle size in the fluid stream.

For liquids, choke flow will be determined by conventional cavitation index, designated sigma:

$$\sigma = p_1 - p_v / p_1 - p_2$$

where $p_v$ is the absolute thermodynamic vapor pressure of the liquid flowing through the device, $p_1$ and $p_2$ are the absolute pressures upstream and downstream, respectively, in the first stage member 50.

Referring now to FIG. 5, the assembly is shown with the valve plug 28 in place in the annulus of first stage member 50. As shown in the cutaway portion, the fluid flowing into the central annulus is diverted radially by the lower face of plug 28. The total flow rate through the control valve assembly is adjusted by moving the plug 28 to permit the upstream fluid to flow through a greater or fewer number of axial passages 54 in tube 51.

Figure 6:
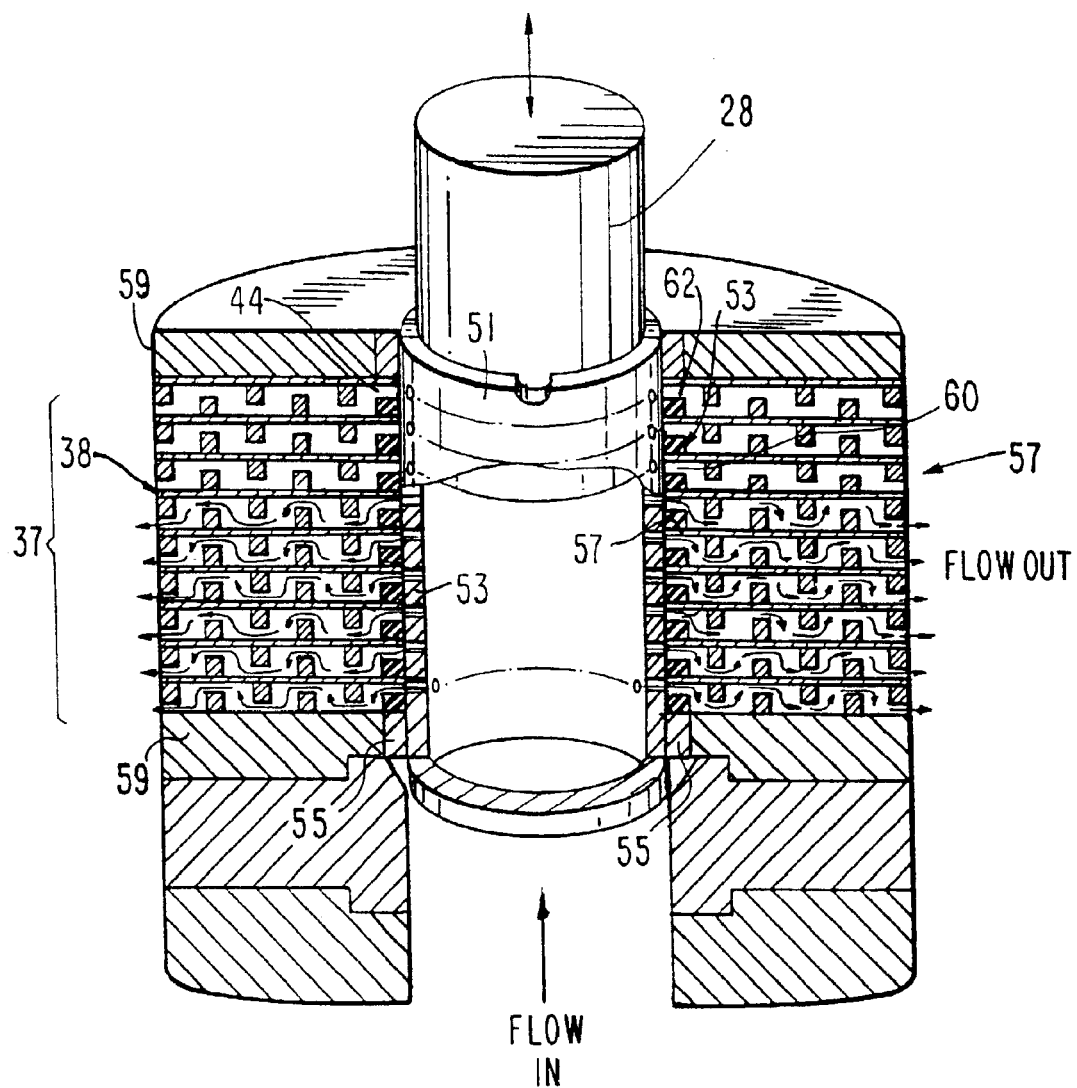
FIG. 6 is a top perspective schematic view, partly in section and cut-away, similar to FIG. 4, with the valve plug in position.

Referring now to FIG. 6, the assembly is shown with the valve plug 28 in place in the annulus of first stage member 50. As shown in the cutaway portion, the fluid flowing into the central annulus is diverted radially by the lower face of plug 28. The total flow rate through the control valve assembly is adjusted by moving the plug 28 to permit the upstream fluid to flow through a greater or fewer number of axial passages 54 in tube 51.

It will also be understood that any metal particles or other debris that are too large to pass through the relatively smaller passages 54 are prevented from entering the tortuous passages of disk stack assembly 37. Damage to or blocking of the more expensive portion of the control valve is thereby prevented or greatly reduced.

Debris in the flowing fluid stream will be stopped at the surface of the central annulus of tube 51. In the event that the performance of the assembly is adversely effected by an accumulation of such debris, the valve assembly can be isolated and the interior surface of tube 51 scraped to clear the debris. If this action does not produce a satisfactory result, the first stage member 50 can be axially withdrawn from the stacked disk device 37 utilizing a mandrel and bearing press, and/or the assembly can be thermally treated. A reconditioned or a new first stage member 50 can then be thermally fitted into position.

The following examples are representative of the flow characteristics and pressure differentials attained with a valve trim constructed in accordance with the present invention. The size of the pipeline or plant process piping can range from 4 inches (10 cm) to 24 inches (60 cm) in diameter.

EXAMPLE 1

A valve trim constructed in accordance with the invention is installed upstream of a gas processing plant that includes three phase separators. The process stream is a sour feed gas and liquid mixture that contains a significant amount of sand and/or mineral debris, as well as construction debris in the form of metal particles. Both types of debris are known to cause extensive damage to prior art valve trims.

The incoming fluid is at 1200 PSIG, with a flow rate of 2,202,000 lb/hr at a temperature of 150° F. The other characteristics of the fluid are:

| Specific Gravity | 0.66 |
| Vapor Pressure | 500 PSIG |
| Critical Pressure | 880 PSIA |
| Compressibility | 0.82 |
| Flow Coefficient | 880 |

A 10-inch (25.4 cm), ANSI 600, trim valve of the invention is installed in the process piping system operated to reduce the outlet pressure downstream of the valve to 500 PSIG from the inlet 1200 PSIG. The plug is moved into and out of the annular bore of the trim valve many times during the course of routine operations without any apparent damage to the valve or adverse changes in the valve's operating characteristics and performance.

The acoustic noise generated taken in the immediate vicinity of the valve during operations under various conditions is less than 90 dBA.

The valve trim of the invention will have utility in a variety of industrial applications. The following example utilizes the invention in an apparatus that vents gas to a flare stack where it is combusted in the atmosphere. Flare headers or manifolds normally operate at very low pressures. Since the feedstream pressure must be reduced 13 to 150-fold, the expansion of the flare gas is significant. When valves of the prior art are installed in this application, they have proved to have a relatively short service life due to severe damage caused by construction debris and internal pipe scale that is carried along by the gas stream.

EXAMPLE 2

A 24-inch valve trim of the invention is installed in a flare gas pipeline where the incoming gas is at 232 PSIG, with a flow rate of 232 million SCFD (Standard Cubic Feet/Day), at a temperature of 160° F. Other characteristics of the gas are:

| Molecular Weight | 28.59 |
| Compressibility | 0.95 |
| Flow Coefficient | 880 |

The valve with about 14 stages of pressure reduction is required to provide a gas stream output at 5 PSIG with a sound pressure level of less than 85 dBA.

I claim:

1. A pressure-reducing valve assembly for use in a high-pressure fluid piping system, the valve assembly comprising:
    a first stage annular cylindrical member having a plurality of regularly-spaced radial fluid passages extending to outlets in its exterior wall, the interior surface of the annular member configured to receive a movable plug in sealing relation, and
    a second stage multiple-path stacked disk drag valve member having a circular opening extending along its axis, a plurality of regularly-spaced, tortuous fluid passages extending generally radially from inlet ports at the axial opening to discharge ports at the exterior surface, the axial opening configured to operably receive the first stage cylindrical member in close-fitting relation, the radial passages of the first stage member being in fluid communication with the fluid passages of the drag valve member, a plurality of radially extending circumferential seals on the exterior wall of the first stage member at positions intermediate the outlets of the plurality of radial fluid passages, whereby fluid flow is maintained in a radial direction between adjacent seals.

2. The valve assembly of claim 1, wherein the circumferential seals are integrally formed in the exterior surface of the first member.

3. The valve assembly of claim 1, wherein the first stage member is fabricated from a material selected from the group consisting of series 400 hardened stainless steel, cobalt-based alloys, Inconel alloys and tungsten carbide.

4. The valve assembly of claim 1, wherein the first stage member is removable in sliding engagement with the second stage member.

5. The valve assembly of claim 4, wherein the first stage and second stage members are engaged in a press fit, a shrink fit or a thermal press fit.

6. The valve assembly of claim 1, wherein the wall thickness of the first stage member is from 6 mm to 20 mm.

7. The valve assembly of claim 1, wherein the plurality of radial fluid passages in the first stage member are cylindrical and range from 2 mm to 10 mm in diameter.

8. The valve assembly of claim 1, wherein the outlets of the plurality of radial fluid passages of the first stage member are offset from the inlet ports of the axial passages of the drag valve, whereby the pressure loss across the valve assembly is further increased.

9. The valve assembly of claim 1, wherein the plurality of radial fluid passages in the first stage member are of uniform size and configuration.

10. The valve assembly of claim 1, wherein the plurality of radial fluid passages in the first stage member vary in diameter.

11. The valve assembly of claim 1, wherein the first stage and second stage members are joined in a press fit, a shrink fit or a thermal press fit.

12. A first stage pressure-reducing member for use with a second stage high-pressure annular stacked disk drag valve having a circular axial opening for receiving a flowing fluid through a plurality of regularly-spaced fluid inlet ports, the first stage member comprising:
- an annular cylindrical tube having a plurality of regularly-spaced radial fluid passages extending through the wall of the tube, the plurality of passages terminating in outlet ports aligned for fluid communication with the inlet ports of the drag valve, the exterior surface of the first stage member configured to contact the axial opening of the drag valve in a fluid-tight sealing relation, and the interior surface of the tube configured to receive a moveable plug in sealing relation; and
- a plurality of circumferential ring seals extending radially from the exterior surface of the tube, the ring seals being spaced from each other and intermediate the outlets of the plurality of radial fluid passages, the seals providing a fluid-tight fit with the surface of the axial opening of the drag valve.

13. The first stage member of claim 12 depending on the severity that is fabricated from a material selected from the group consisting of series 400 hardened stainless steel, cobalt based alloys, Inconel 625 and Tungsten Carbide.

14. The first stage member of claim 12, wherein the ring seals are formed by machining the exterior surface of the tube.

15. The first stage member of claim 12, wherein the radial passages are of uniform flow area.

16. The first stage member of claim 15, wherein the radial passages are circular in cross-section.

17. The first stage member of claim 12, wherein the radial passes have an outwardly tapering configuration.

18. The first stage member of claim 12, wherein the radial spacing between adjacent longitudinal arrays of the radial passages is equal.

19. The first stage member of claim 12, wherein the radial spacing between adjacent longitudinal arrays of the radial fluid passages varies.

20. The first stage member of claim 16, wherein the diameter of the passages is from about 2 mm to 10 mm.

21. The pressure reducing member of claim 12, wherein the ring seals extend a distance d from the exterior surface of the tube, d being the mean diameter of the fluid passages in the tube.

* * * * *